J. E. HEIMERL.
HEATED RECEPTACLE FOR MEALS.
APPLICATION FILED JUNE 26, 1916.

1,227,782.

Patented May 29, 1917.

UNITED STATES PATENT OFFICE.

JULIUS E. HEIMERL, OF MILWAUKEE, WISCONSIN.

HEATED RECEPTACLE FOR MEALS.

1,227,782.

Specification of Letters Patent.

Patented May 29, 1917.

Application filed June 26, 1916. Serial No. 105,836.

*To all whom it may concern:*

Be it known that I, JULIUS E. HEIMERL, a citizen of the United States, and resident of Milwaukee, in the county of Milwaukee and State of Wisconsin, have invented certain new and useful Improvements in Heated Receptacles for Meals; and I do hereby declare that the following is a full, clear, and exact description thereof.

The present invention relates to new and useful improvements in heated receptacles for meals whereby meals may be transported and retained in a heated condition for an indefinite length of time, the invention being more particularly directed to such a receptacle of the general type embodied in Patent No. 1,185,664, granted to me June 6, 1916.

It is in general the object of the present invention to further simplify the construction and improve the efficiency and convenience of manipulation of devices of this character.

It is more specifically an object to provide an arrangement wherein the fuel burner may be detachably secured on the bottom of the main receptacle in such manner that disposal of a food container in the main casing will hold the fuel burner against possible displacement.

It is further an object to provide an arrangement whereby the fuel burner may occupy a minimum space in the receptacle.

With the above and other objects and advantages in view, the invention resides more particularly in the novel combination, formation and arrangement of parts more particularly hereinafter described and pointed out in the appended claims.

Figure 1:
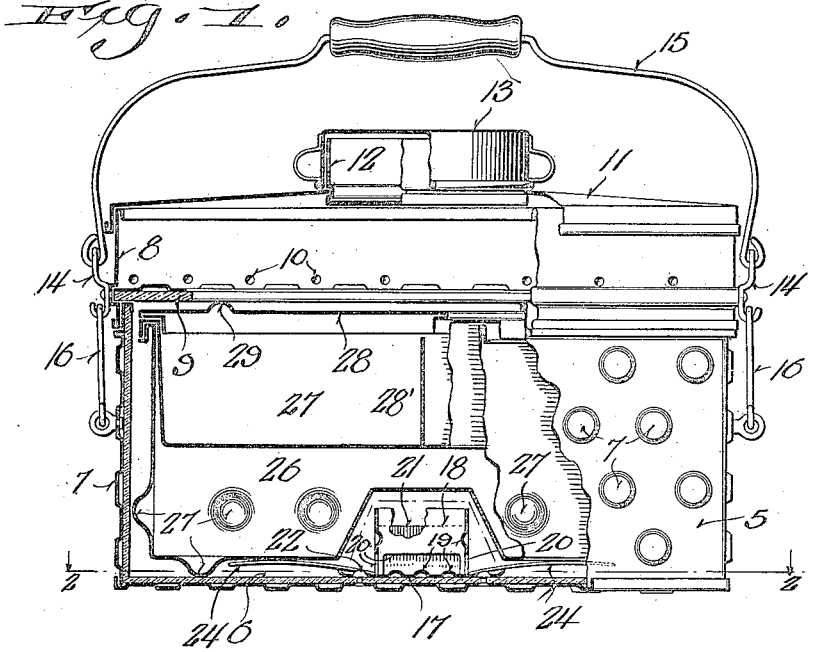
Figure 1 is a side elevational view of a heated receptacle constructed in accordance with the present invention, with a portion of the receptacle broken away to more clearly disclose the structure.
Figure 2:
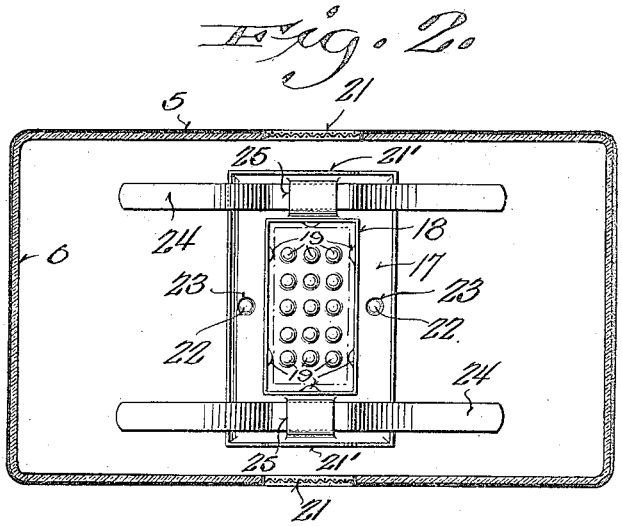
Fig. 2 is a horizontal sectional view on the line 2—2 of Fig. 1.

Referring now more particularly to the accompanying drawings, the body of the present device comprises an outer casing 5 including a bottom and side and end walls formed of metal and having a lining of heat insulating material 6, portions of the walls being offset outwardly in cupped shape at 7 to provide dead air spaces further promoting the insulation of heat in the receptacle.

For closing the main casing, a pan shaped cold food container 8 is provided which has its wall portions extended below its bottom to embrace the walls of the main casing, the bottom of this container being provided with a heat insulating lining 9 preventing transmission of heat retained in the outer casing, to the cold food container, and the walls of the container are provided with a plurality of air holes 10 whereby a free circulation of air through the container may be had to promote a desired coolness, it being understood that this container is adapted for holding fruit or cakes. A flanged cover 11 is provided for the cold food container, and this cover is provided with a central aperture in which is fixedly set the base portion of a cup 12 adapted to receive any desired article of food, and this cup 12 is normally closed by a beverage cup 13 which is inverted to fit over the cup 12. Brackets 14 are secured to the end wall portions of the cold food container 8 and a suitable bail handle 15 is attached to these brackets. The lower ends of the brackets are curved in hook shape and engaged with these ends are hooks 16 carried by the end wall portions of the outer casing, whereby all the parts heretofore described may be secured in assembled relation.

The heating means for the interior of the outer casing 6 comprises a burner formed of a pan shaped plate 17 having upstanding wall portions 18 spaced inwardly from its edges and adapted to receive a block of charcoal or similar fuel, and these walls together with that portion of the plate bounded thereby are provided with inwardly struck projections 19 whereby the charcoal is held to permit a free circulation of air thereabout. The lower intermediate portion of the walls 18 are cut away at 20 and access of air to the burner is had through screened apertures 21 in the central bottom portions of the sides of the outer casing, a too direct draft of air being prevented by upwardly projecting portions 21' of the end walls of the pan shaped plate 17. The plate 17 is held on the bottom of the outer casing by means of projections 22 on the said bottom which engage in recesses 23 in the said plate and these recesses and projections are held in interlocking relation by a pair of spring strips 24 which have their intermediate portions secured to the plate by passing the strips through pairs of slits 25 in the plate, the end portions of these spring strips extending upwardly and being engageable by the main container 26 which is disposed in the outer casing. The bottom of this main container is transversely inwardly offset at its central portion to receive the burner walls 18, and thus the container may fill substantially the entire interior of the outer casing, the walls and bottom of the container however, being spaced from the walls and bottom of the outer casing to provide for a free distribution of heat. The container is retained in this spaced position by outwardly struck projections 27 on the lower portions of its walls and on its bottom, which engage the outer casing.

Disposed in the main container is an inner container 27 which is provided with a partition 28' whereby it may contain a plurality of different foods and the mouth edges of this container 27 are projected outwardly and then downwardly whereby to seat on the mouth of the main container, and to provide a relatively tight closure. This inner container is provided with a flanged cover 28 which is formed with upwardly struck projections 29 engageable with the bottom of the cold food container to hold said cover spaced therefrom.

The main container 26 is adapted to contain a beverage such as coffee, while the inner container is adapted for containing meat and vegetables.

From the foregoing arrangement it will be seen that a heater receptacle for meals has been provided wherein a maximum compactness of structure is procured and wherein the containers of foods which are desired to retain heat are entirely spaced from the outer casing to provide for a maximum application of heat thereto.

It is noted that when the top of the outer casing is closed by the cold food container, that the top of the main container is depressed below the mouth of the outer casing, To provide for a very ready removal of the main container however, the spring strips 24 which hold the burner in interlocking relation with the bottom of the outer casing, are of such strength as to lift the main container above the outer casing whereby it may be readily grasped for removal.

I claim:

1. A heated receptacle for meals comprising an outer casing, a burner detachably seated on the bottom of the casing and provided with recesses, projections on the bottom engageable in said recesses, a removable container in the casing, and springs carried by the burner and engageable by the container to hold said recesses and projections in engagement.

2. A heated receptacle for meals comprising an outer casing, a burner in the bottom of the casing, a main container in the casing having its bottom inwardly offset to receive said burner, outwardly struck projections on the main container engaging the casing to hold the container spaced therefrom and a second container mounted in the upper portion of the main container.

3. In a heated receptacle for meals, a casing, a pan shaped plate detachably engageable with the bottom of the casing, upstanding wall portions on said plate apertured in their lower portion, and inwardly struck projections on the walls and the portions of the plate bounded thereby.

In testimony that I claim the foregoing I have hereunto set my hand at Milwaukee in the county of Milwaukee and State of Wisconsin.

JULIUS E. HEIMERL.

Copies of this patent may be obtained for five cents each, by addressing the "Commissioner of Patents, Washington, D. C."